US008224756B2

(12) United States Patent
Roberts et al.

(10) Patent No.: US 8,224,756 B2
(45) Date of Patent: Jul. 17, 2012

(54) APPARATUS AND METHOD FOR MANAGING A SOCIAL NETWORK

(75) Inventors: Linda Roberts, Decatur, GA (US); E-Lee Chang, Mableton, GA (US); Ja-Young Sung, Atlanta, GA (US); Natasha Barrett Schultz, Lawrenceville, GA (US); Robert Arthur King, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 308 days.

(21) Appl. No.: 12/613,382

(22) Filed: Nov. 5, 2009

(65) Prior Publication Data

US 2011/0106718 A1 May 5, 2011

(51) Int. Cl.
G06Q 99/00 (2006.01)
(52) U.S. Cl. ....................................................... 705/319
(58) Field of Classification Search .................. None
See application file for complete search history.

(56) References Cited

U.S. PATENT DOCUMENTS

| 5,223,924 | A | 6/1993 | Strubbe |
| 5,920,694 | A | 7/1999 | Carleton et al. |
| 6,272,231 | B1 | 8/2001 | Maurer et al. |
| 6,357,042 | B2 | 3/2002 | Srinivasan et al. |
| 6,438,579 | B1 | 8/2002 | Hosken |
| 6,567,797 | B1 | 5/2003 | Schuetze et al. |
| 6,580,811 | B2 | 6/2003 | Maurer et al. |
| 6,732,146 | B1 | 5/2004 | Miyake |
| 6,792,412 | B1 | 9/2004 | Sullivan et al. |
| 6,948,131 | B1 | 9/2005 | Neven et al. |
| 7,031,931 | B1 | 4/2006 | Meyers |
| 7,051,352 | B1 | 5/2006 | Schaffer |
| 7,966,638 | B2 * | 6/2011 | Gossweiler et al. .......... 725/133 |
| 2002/0010759 | A1 | 1/2002 | Hitson et al. |
| 2002/0059094 | A1 | 5/2002 | Hosea et al. |
| 2002/0097265 | A1 | 7/2002 | Kurapati et al. |
| 2002/0162107 | A1 | 10/2002 | Gutta et al. |
| 2002/0178057 | A1 | 11/2002 | Bertram et al. |
| 2002/0193066 | A1 | 12/2002 | Connelly |
| 2002/0194586 | A1 | 12/2002 | Gutta et al. |
| 2002/0199194 | A1 | 12/2002 | Ali |
| 2003/0066068 | A1 | 4/2003 | Gutta et al. |
| 2003/0101450 | A1 | 5/2003 | Davidsson et al. |
| 2003/0234805 | A1 | 12/2003 | Toyama et al. |
| 2004/0003392 | A1 | 1/2004 | Trajkovic et al. |
| 2004/0064526 | A1 | 4/2004 | Lee et al. |
| 2005/0131918 | A1 | 6/2005 | Hillis et al. |

(Continued)

OTHER PUBLICATIONS

WWW.YOUTUBE.COM, "Netflix Party on XBox Live", 3-page article, http://www.youtube.com/watch?v=_FuPxEC8Tfc &feature=related, web site last visited Jan. 20, 2010.

(Continued)

Primary Examiner — Jonathan Ouellette
(74) Attorney, Agent, or Firm — Guntin Meles & Gust, PLC; Andrew Gust

(57) ABSTRACT

A system that incorporates teachings of the present disclosure may include, for example, a system having a controller to collect one or more user-generated comments from each of a plurality of computing devices, detect a correlation in the one or more user-generated comments collected from the plurality of computing devices, and establish a social network between the plurality of computing devices according to the detected correlation. The one or more user-generated comments can be temporally associated with media content presented at the plurality of computing devices. Other embodiments are disclosed.

18 Claims, 8 Drawing Sheets

U.S. PATENT DOCUMENTS

| | | | |
|---|---|---|---|
| 2005/0144632 | A1 | 6/2005 | Mears et al. |
| 2005/0149974 | A1 | 7/2005 | Norman |
| 2006/0020614 | A1 | 1/2006 | Kolawa et al. |
| 2006/0026502 | A1 | 2/2006 | Dutta |
| 2006/0168150 | A1 | 7/2006 | Naik et al. |
| 2006/0190966 | A1 | 8/2006 | McKissick et al. |
| 2006/0218481 | A1 | 9/2006 | Adams, Jr. et al. |
| 2006/0259355 | A1 | 11/2006 | Farouki et al. |
| 2006/0271997 | A1 | 11/2006 | Jacoby et al. |
| 2006/0288041 | A1 | 12/2006 | Plastina et al. |
| 2007/0011039 | A1 | 1/2007 | Oddo |
| 2008/0222295 | A1* | 9/2008 | Robinson et al. ............. 709/227 |
| 2008/0288596 | A1* | 11/2008 | Smith et al. ................... 709/206 |
| 2009/0083260 | A1* | 3/2009 | Artom et al. ....................... 707/5 |
| 2010/0017474 | A1* | 1/2010 | Kandekar et al. ............. 709/205 |
| 2010/0023878 | A1* | 1/2010 | Douris et al. ................. 715/757 |
| 2010/0153175 | A1* | 6/2010 | Pearson et al. .................. 705/10 |
| 2010/0241968 | A1* | 9/2010 | Tarara et al. .................. 715/751 |
| 2010/0287033 | A1* | 11/2010 | Mathur ........................... 705/10 |

OTHER PUBLICATIONS

WWW.YOUTUBE.COM, "NXE Dashboard, Aug. 11th Update Preview Program—Netflix Party", 2-page article, http://www.youtube.com/watch?v=2brb-gCl2ss, web site last visited Jan. 20, 2010.

Georgia Tech., "Avatar Theater—Experimental TV Lab at Georgia Lab", 2-page article, http://etv.gatech.edu/projects/avatar-theater/, web site last visited Jan. 20, 2010.

Konstantinos Chorianopoulos, "Content-Enriched Communication—Supporting the Social Uses of TV", 10-page article, The Journal of the Communications Network, vol. 6, Part 1, Jan.-Mar. 2007.

Khadraoui et al., "Interactive TV Show Based on Avatars", IEEE: Systems Communications, 2005, Proceedings, Aug. 17, 2005, pp. 192-197.

Luyten et al., "Telebuddies: Social Stitching with Interactive Television" Hasselt University—Transnationale Universiteit Limburg, Belgium, 6-page article, CHI 2006, Apr. 22-27, 2006.

Weisz et al., "Watching Together: Integrating Text Chat with Video", Carnegie Mellon University/University of Minnesota, 10-page article, CHI 2007, Apr. 28-May 3, 2007.

Coppens et al., "AmigoTV: Towards a Social TV Experience", Alcatel Bell R&I Residential Networked Applications, 4-page article, Prior Art Date: Apr. 1, 2004.

Nathan et al., "CollaboraTV: Making Television Viewing Social Again", pp. 85-94, axTV'08, Oct. 22-24, 2008.

Oehlberg et al., "Designing for Distributed, Sociable Television Viewing", Stanford University, Mechanical Engineering, Palo Alto Research Center, 10-page article, Prior Art Date: May 2006.

\* cited by examiner

Communication Devices

300

400

500

600

800

APPARATUS AND METHOD FOR MANAGING A SOCIAL NETWORK

RELATED APPLICATION

U.S. patent application Ser. No. 12/146,131, filed Jun. 25, 2008, by Amento et al., entitled "Method and Apparatus for Presenting Media Programs." All sections of the aforementioned application are incorporated herein by reference.

FIELD OF THE DISCLOSURE

The present disclosure relates generally to media content and more specifically to an apparatus and method for managing a social network.

BACKGROUND

Consumers have a number of venues to access media content. For example, consumers can view video content supplied by social networking portals such as MySpace, FaceBook, and YouTube over an Internet browser. Similarly, consumers can view via a set-top box video content supplied by an Internet Protocol Television (IPTV) communication system, a satellite TV communication system, cable TV communication system, or other interactive TV systems. Other forms of media content such as audio content, pictures, articles, or combinations thereof can also be accessed by consumers over a public network such as the Internet.

Consumers can share with others their thoughts about media content they have consumed by word of mouth, text messaging (e.g., email), or other forms of common communication.

DETAILED DESCRIPTION

One embodiment of the present disclosure can entail a method involving presenting an overlay combined with a presentation of media content at each of a plurality of computing devices to illustrate a collection of one or more user-generated comments temporally associated with portions of the presented media content, collecting one or more user-generated comments from each of the plurality of computing devices, detecting a correlation in the one or more user-generated comments collected from the plurality of computing devices, and establishing a social network between at least a subset of the plurality of computing devices according to the detected correlation.

One embodiment of the present disclosure can entail a system having a controller to collect one or more comments from each of a plurality of computing devices, detect a correlation in the one or more comments collected from the plurality of computing devices, and establish a social network between at least a subset of the plurality of computing devices according to the detected correlation. The one or more comments can be temporally associated with media content presented at the plurality of computing devices.

One embodiment of the present disclosure can entail a computer-readable storage medium in a computing device having computer instructions to collect one or more comments temporally associated with a presentation of media content, and transmit to a system the comments. The system can be operable to collect the one or more comments from the computing device along with other comments from other computing devices, detect a correlation in the one or more comments collected from the plurality of computing devices, and establish a social network between at least a subset of the plurality of computing devices according to the detected correlation.

Figure 1:
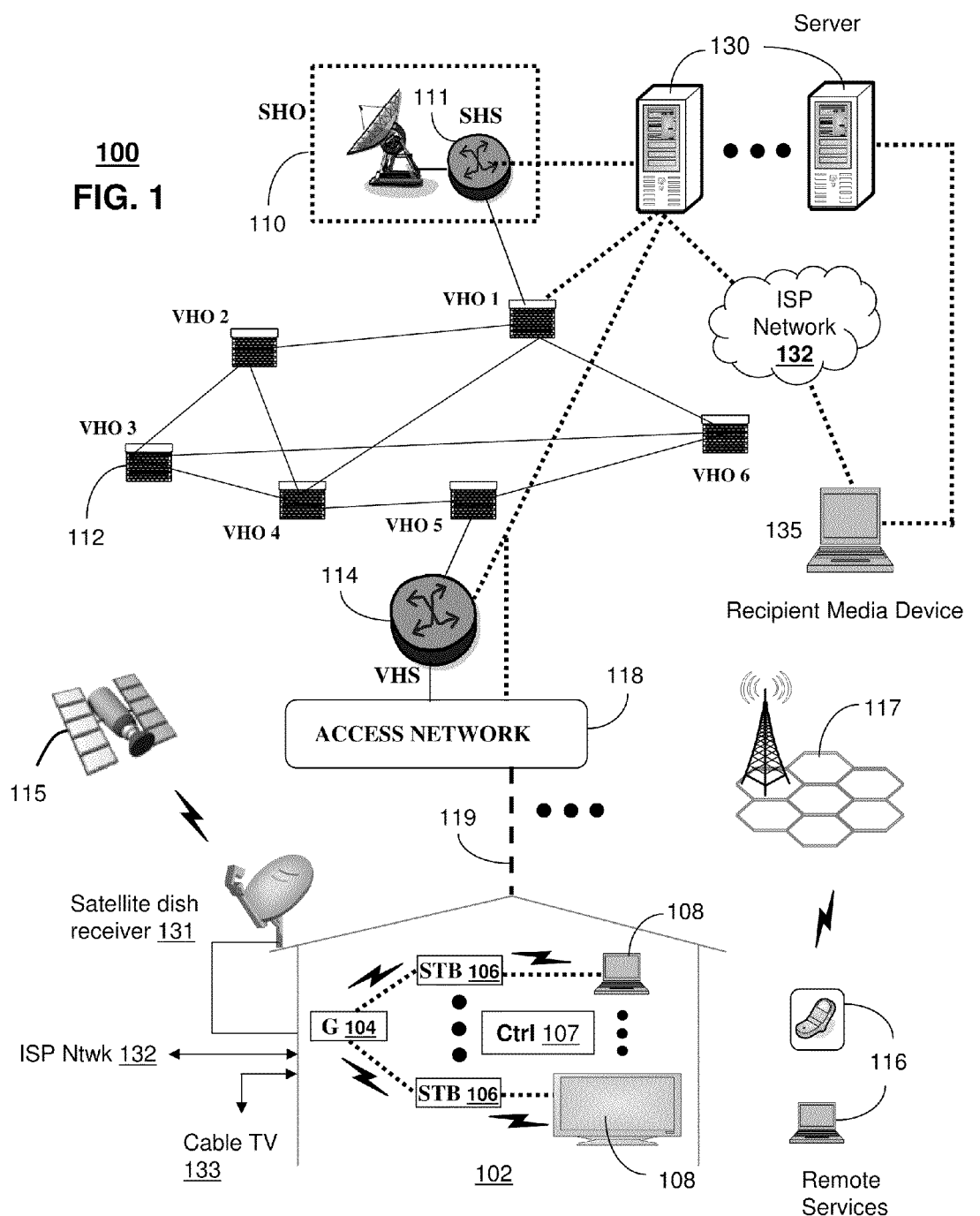
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a recipient media device 135. The recipient media device 135 can be communicatively linked to the ISP network 132, the one or more computing devices 130, and to other devices in the system 100. Notably, the recipient media device 135 can be a STB, mobile device, personal computer, telephone, personal digital assistant (PDA), or other device capable of receiving and transmitting media content. Furthermore, the recipient media device 135 can be configured to operate in an iTV network, which can include, but is not limited to including, IPTV, interactive cable television, and interactive satellite television.

The recipient media device 135 can be configured to transmit requests for media content and commentary associated with the media content from devices in the system 100. The commentary can be user-generated and can be in a temporal vicinity of the associated media content. The media content and associated commentary can come from devices such as, but is not limited to, STBs 106, media devices 108, and wireless communications device 116. Notably, the media content and associated commentary can include video content, audio content, still image content, text content, and other media content. Additionally, the recipient media device 135 can be configured to receive and respond to requests from devices in the system 100 for media content and commentary associated with the media content. In responding to the requests from the devices, the recipient media device 135 can transmit media content and commentary associated with the recipient media device 135 to the requesting devices.

Another distinct portion of the computing devices 130 can function as a server (herein referred to as server 130). The server 130 can use common computing and communication technology to perform the function of receiving, transmitting, maintaining, processing, and storing various types of content. As mentioned above, such content can include video content, audio content, still image content, text content, and other content. The server 130 can maintain a client program, which can be downloaded and/or accessed by the devices in the system 100. The client program can be configured to present an overlay that can be superimposed onto the media content and can allow users of the devices in the system 100 to associate a comment with media content received at the devices.

Additionally, the server 130 can be configured to receive requests for the media content and commentary associated with the media content from the devices in the system 100, such as the recipient media device 135 and the STBs 106. Furthermore, the server 130 can relay and/or store the actual media content and/or the commentary associated with the media content, and/or relay links to the media content and/or commentary associated with the media content to the devices in the system 100 requesting the content and/or commentary.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
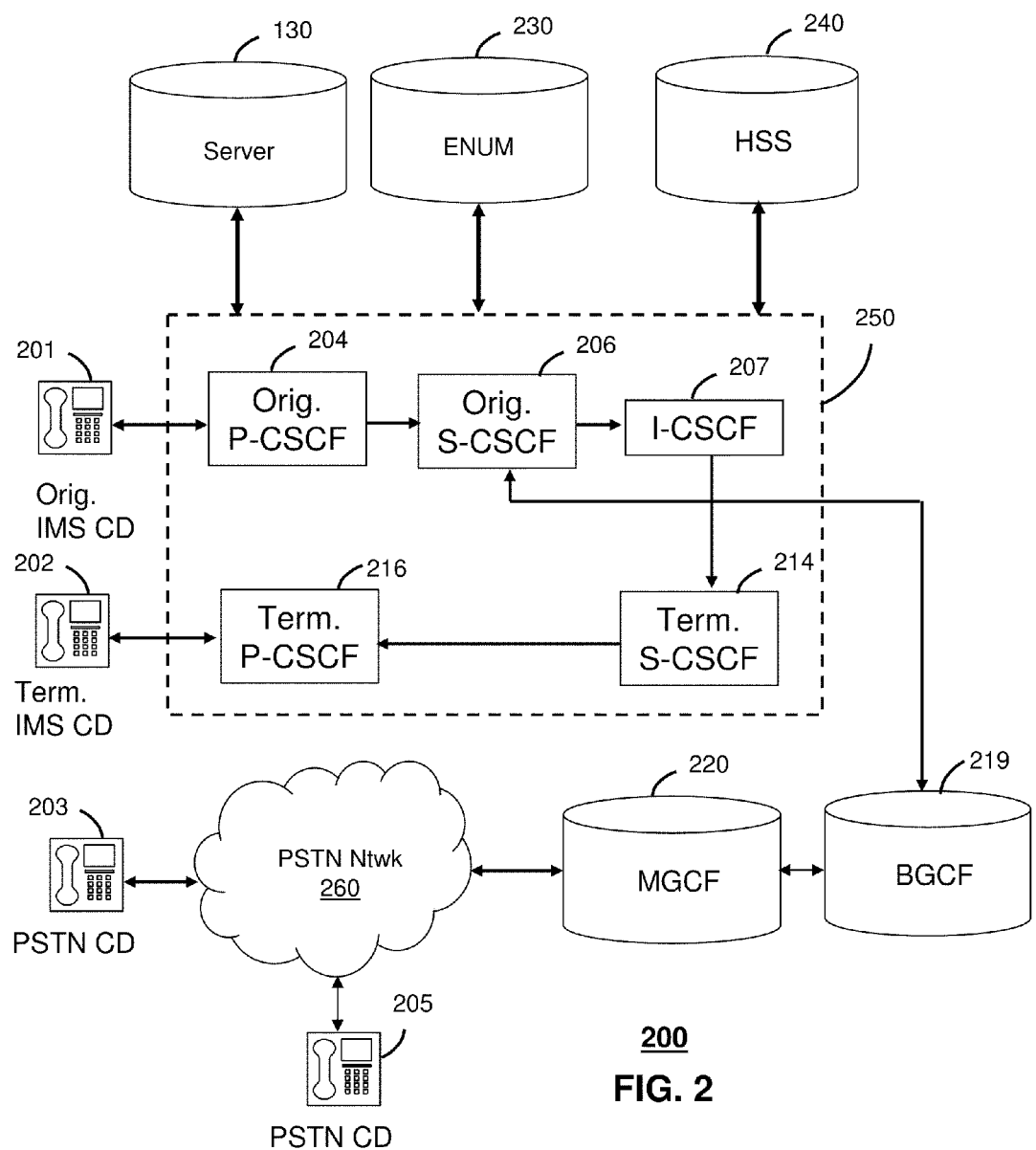

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
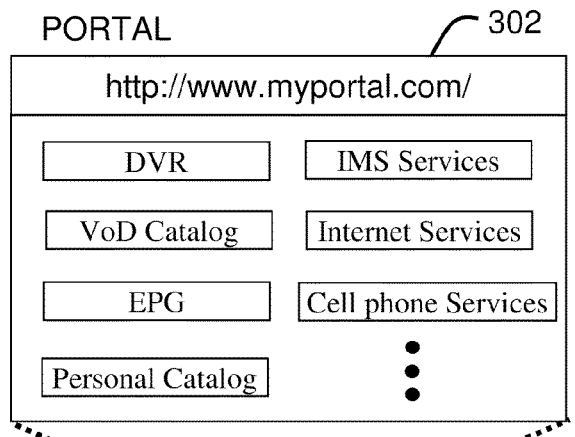
FIG. 3 depicts an illustrative embodiment of a portal interacting with the communication systems of FIGS. 1-2.
Figure 3:
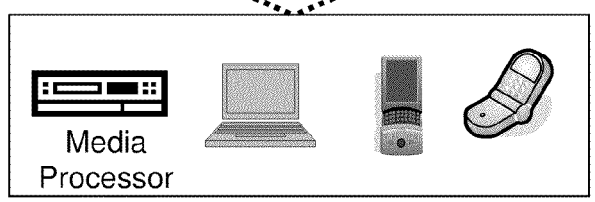

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
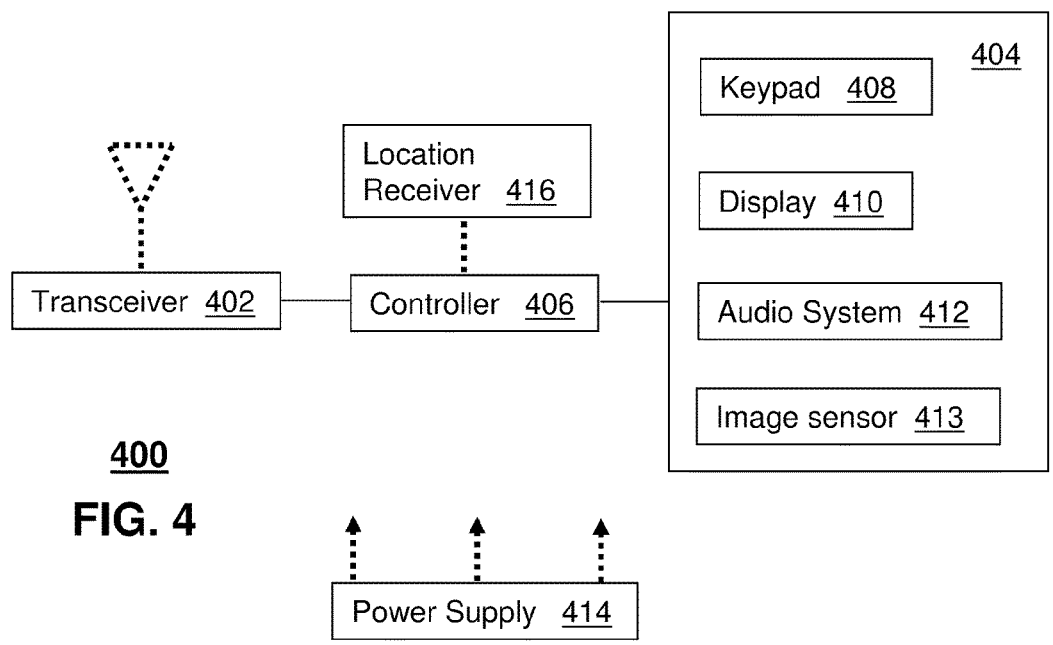
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
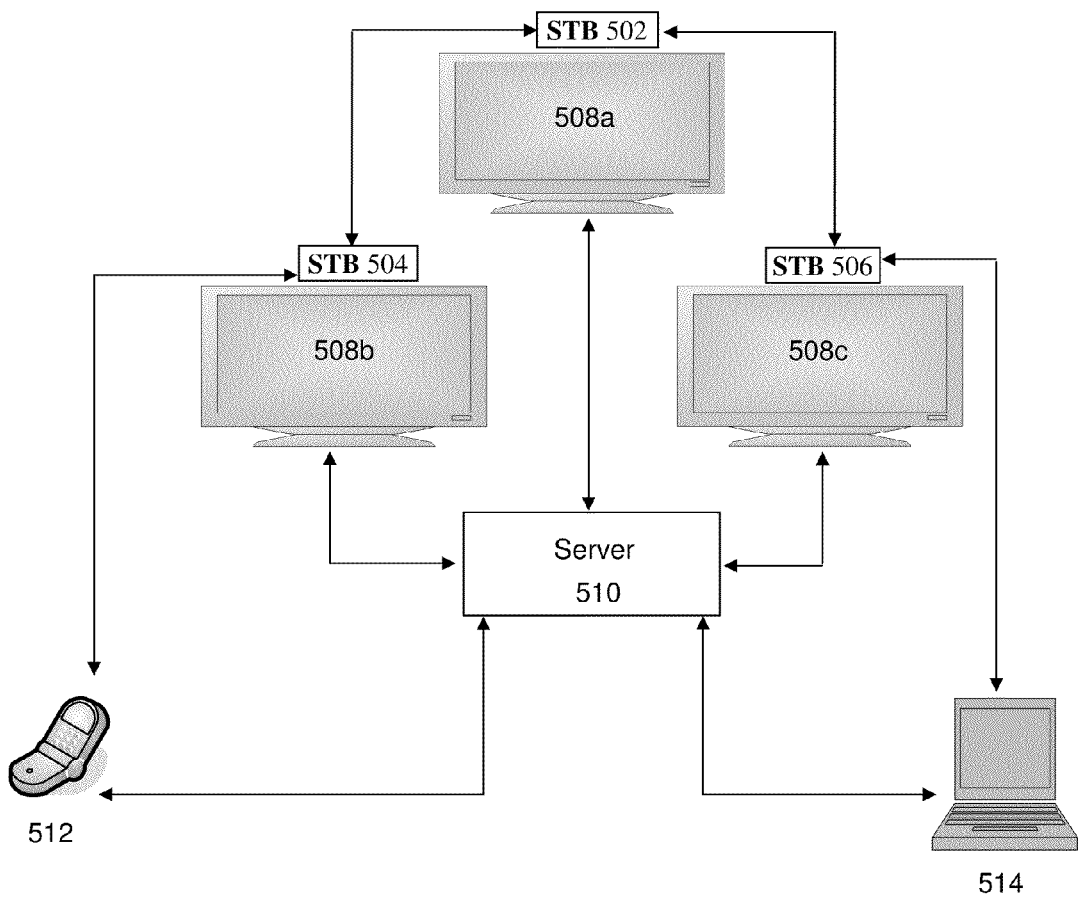
FIG. 5 depicts an illustrative embodiment of a system for transmitting media content, the system operable in the communications systems of FIGS. 1-2.

FIG. 5 depicts an illustrative embodiment of a system 500 for transmitting media content, the system 500 being operable in portions of the communications systems of FIGS. 1-2. The system 500 can include one or more media devices 502, 504, and 506, which can be configured to deliver media content to display devices 508a-c and deliver and/or receive media content from server 510, communications device 512, and computing device 514. The media devices 502, 504, and 506 can be STBs or other similar media devices. The display devices 508a-c can include any device capable of displaying and/or playing media content such as televisions, cellular phones, personal digital assistants (PDA), computers, and the like. The server 510 can be a device including the operative features of server 130, among other features. The communications device 512 can include, for example, a mobile device, a cellular phone, wireless device, or other communications device and the computing device 514 can be a computer or laptop.

The server 510 can be utilized to communicatively link the media devices 502 to the other devices of the system 500. Notably, the server 510 can be configured to receive, transmit, maintain, and store various types of media content. Additionally, the server 510 can include a client program, which can be accessed, downloaded, and/or otherwise utilized by the devices in the system 500. The client program can present an overlay that can be superimposed onto media content that is displayed and/or received at the devices in the system 500. Users of the client program can use the client program to associate commentary/comments with the media content accessed by the user.

Users of the client program can select a portion of the media content and insert a comment in a temporal vicinity of the media content. For example, if the user is watching a television show, the user can select a particular scene or segment, or select a button which at the time the button is depressed creates a temporal association with a scene or segment of the show. Responsive to this selection, the user can create a commentary by common means such as by keyboard input, or a microphone that can captures speech which can be translated to text using common voice recognition techniques. The commentary (or user-generated comment) in turn can be associated with the scene or segment at the particular point in time that the scene or segment is shown. Of course, multiple users experiencing the same media content (synchronously or asynchronously between the users) can each insert their own comments to associate with the media content as well.

Figure 6:
FIG. 6 depicts a screenshot illustrating commentary on a timeline associated with a media program.

Referring now also to FIG. 6, a screenshot 600 illustrating commentary on a timeline associated with a media program, is illustratively shown. The screenshot 600 features an overlay generated by the client program. The overlay can include menu buttons and other operative controls which are featured on the screenshot 600. Notably, the overlay can include a timeline 601, which can reflect the entire duration of a media program playing at a user's media device.

Screenshot 600 illustrates comments inserted at various points in the timeline 601 of the media program. The iconic spheres in the screenshot 600 can indicate that a comment has been inserted at that particular point in the timeline 601 of the media program. For example, a single comment 602, a single comment 604, a single comment 606, and four comments 608 have been inserted into the timeline 601. Once the user-generated comments are associated with their respective media segments, the user can utilize the client program to transmit the media content, commentary/comments, and/or links to the content and commentary to the server 510.

The server 510 can be configured to access, store, and maintain the media content, commentary, and/or links to the media content and commentary. Additionally, the server 510 can be configured to maintain information about the media content and commentary. If only the links to the media content are sent to the server 510, the server 510 can be configured to identify and extract the actual media content associated with the link. Similarly, if only the links to the commentary are sent to the server 510, the server 510 can be configured to extract the actual commentary associated with the link.

The server 510 and/or the other devices in the system 500 can be configured to receive requests for the commentary and/or the media content from recipient media devices, which can be the devices in the system 500. For example, media device 502 can transmit a request to server 510 for media content and commentary from communications device 512. When the server 510 receives a request from a recipient media device, the server 510 can transmit at least a portion of the actual media content and commentary and/or the links to the media content and commentary to the recipient media device. If only the links are sent to the recipient media device, the recipient media device can access the media content and/or commentary via the links.

The recipient media device can then be configured to present the media content and/or commentary through a display device, such as display devices 508a-c. Notably, the users of the recipient media device can utilize the client program much like the users of the media devices generating the commentary. Additionally, user-generated commentary and media content can be generated at the recipient media device and can be transmitted to other devices in the system 500 that request the commentary and/or media content generated at the recipient media device.

In an embodiment, the server 510 can prompt a media device, such as media devices 502, 504, and 506, to set a range of the media content to be transmitted to the server 510. For example, the media device can set a range of the media content, which is thirty seconds before and thirty seconds after any commentary associated with the media content. Notably, the range can be defined by vertical start and end lines within the timeline of the media program that is presented by the client program, such as those surrounding comment 604 in FIG. 6. In another embodiment, the user of the media device can set the range without being prompted by the server 510.

Figure 7:
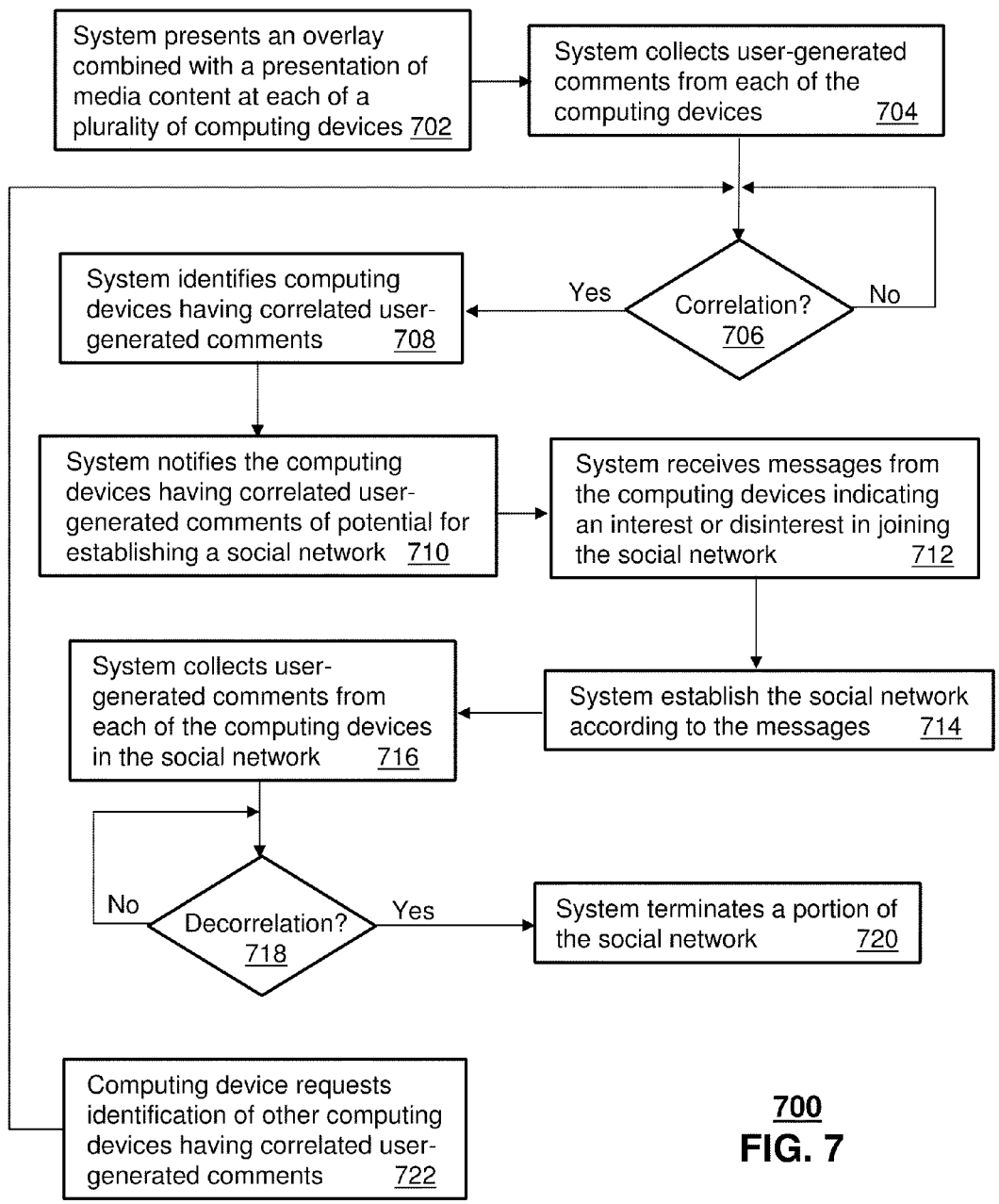
FIG. 7 depicts an illustrative embodiment of a method operable in portions of the communication systems of FIGS. 1-2 and 5.

FIG. 7 depicts an illustrative method 700 operating in portions of the communication systems of FIG. 1-2, and FIG. 5. Method 700 can begin with step 702 in which a system such as server 510 presents an overlay combined with a presentation of media content at each of a plurality of computing devices such as the media devices of FIG. 5. For convenience and illustration purposes only, reference to the system in the flow diagram of FIG. 7 will be replaced with server 510, and reference to a computing device will be replaced with a media device. It will be appreciated that a system and a computing device can take on more than these illustrative embodiments. With this in mind, in step 704, the server 510 can collect user-generated comments as described earlier from each of the media devices.

The server 510 in step 706 can use common pattern recognition techniques such as linear regression or other statistical models to detect a correlation between user-generated comments collected from the media devices. A correlation can represent a degree of similarity between commentaries. The higher the degree of similarity, the higher the likelihood that media device users generating the user-generated commentaries have common interests, thereby representing a detectable behavioral pattern.

Correlation can be determined for example by detecting similar commentaries having a near temporal relation. For instance, the server 510 can detect negative, positive, or narrative commentaries having a temporal proximity to each other in relation to the media content being presented. More specifically for example say five users generate comments about a car chase in a movie which these users are commenting on. Further suppose three out of the five users have positive comments about the car chase, while the other two have negative or neutral comments. Under these circumstances, the server 510 can determine from the user-generated comments that three out of the five users may have common interests in action movies, the types of cars in the car chase, the actors performing in the movie, etc.

The server 510 can be programmed with various degrees of sophistication to determine a correlation between user-generated comments. For instance, the server 510 can be programmed to identify correlations based on demographic or psychographic traits directly or indirectly identified from the user-generated comments collected. The server 510 can also be programmed to detect correlations which can be subcategorized (e.g., likes cars, likes hot rods, likes specific automobile models, etc.). It should be evident from these illustrations that there can be innumerable ways to identify correlations in user-generated comments, which can be useful in identifying users with common interests and/or behaviors. Accordingly, the present disclosure contemplates all possible embodiments for correlating user-generated comments.

When the server 510 detects correlation(s) in step 706, it can proceed to step 708 where it identifies the media devices or users thereof having correlated user-generated comments. The media device and/or users can be identified by any form of identifiable data (e.g., telephone number, user login, social security ID, biometric ID, STB identifier, SIP URI, static IP address, etc.). Once the media devices and/or users have been identified, the server 510 can be programmed to notify the users by transmitting a message to their respective media devices. The message can indicate that a correlation has been detected which may warrant establishing a social network if desired by the users. In step 712, the server 510 can receive messages from the media devices initiated by the users indicating an interest or disinterest from the identified users in joining the social network.

Figure 8:
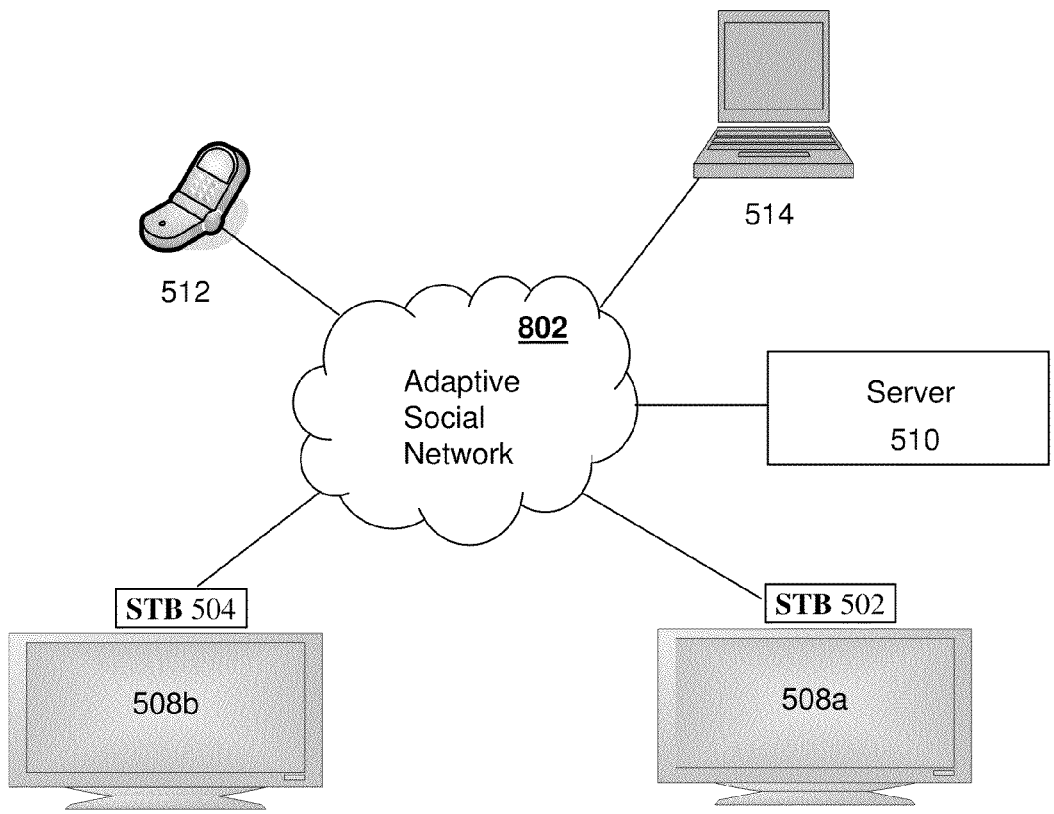
FIG. 8 depicts an illustrative embodiment of an adaptive social network resulting from the method of FIG. 7.

In step 714, the server 510 can establish a social network according to the users indicating from their messages that they are interested in joining a social network. In this step, the server 510 create a virtual or adaptive social network 802 as shown in FIG. 8. The social network can be adaptive from the perspective that the server 510 can be programmed to manage the inclusion or exclusion of users and their media devices over the course of time. The adaptive social network 802 can be implemented with common networking technology such as virtual private network (VPN) connections established between the identified media devices, or by other common networking techniques which can be established through the networks of FIGS. 1-3. The adaptive social network 802 can also be created by way of existing social networking applications such as FaceBook, MySpace, and so on.

Once a social network has been established, the server 510 can continue to collect user-generated comments in step 716 from the users partaking in the adaptive social network 802 by way of their media devices. In step 718, the server 510 can determine if the user-generated comments indicate a decorrelation of interests between the users. In this step the server 510 can monitor from the user-generated comments if one or more users in the adaptive social network 802 have begun to lose interest in certain subject matter, have fallen out of grace with each other, or have demonstrated adverse interests. If a decorrelation has been detected, and if the decorrelation appears to be long-term, the server 510 can be programmed in step 720 to terminate the adaptive social network 802 in whole or in part. It should be noted that the adaptive social network 802 can also expand over time as the server 510 detects in step s 702-714 that other users may have similar interests.

When additional users with common interests are detected, the server 510 can inform the users in an already established social network whether they would be interested in adding additional parties. When decorrelation is detected, the server 510 can also be programmed to inform the remaining users in the social network with common interests whether they have a desire to remove the one or more users with the detected decorrelation. The decision to remove one or more users can be determined by majority vote, or other criteria established by the social network.

In addition to the aforementioned steps, an individual user of a media device can submit to the server 510 in step 722 a request to identify other media devices and/or its respective users having user-generated comments that correlate to the user-generated comments of the user submitting the request. When receiving such a request, the server 510 can identify other users who have commented on the same media content, and thereafter perform correlation analysis as previously described. The server 510 can then compare the user-generated comments of all parties to determine which parties are likely to have common interests with the user submitting the request in step 722. From this point forward, a social network can be established with the requesting user in a manner similar to the above descriptions.

Upon reviewing the aforementioned embodiments, it would be evident to an artisan with ordinary skill in the art that said embodiments can be modified, reduced, or enhanced without departing from the scope and spirit of the claims described below. For example, the server 510 can be an integral part of a social networking application (e.g., MySpace). In this embodiment, creating social networks of users based on a correlation of their user-generated comments can be kept within the community of users utilizing the social networking application. With the above technique, sub-groups of social networks can be created within the social network application.

Additionally, method 700 can be adapted so that all or a portion of the steps described above can be performed in a distributed system. That is, the method can be implemented at each of the media devices without a server. In this embodiment, the media devices can be adapted to communicate amongst each other, share user-generated comments and assess whether correlations exist. Once correlations are detected, messages could be submitted between the media devices to propose invitations to a social network.

It should be further noted that the media devices generating user-generated comments can be generally represented as computing devices of any form having the computing and communication resources to perform the aforementioned embodiments. Thus a computing device can be a mobile phone, a lap top computer, a desktop computing, a gaming console, or any other device capable of establishing a communication session with another device and performing the embodiments of the present disclosure in whole or in part.

Other suitable modifications can be applied to the present disclosure without departing from the scope of the claims below. Accordingly, the reader is directed to the claims section for a fuller understanding of the breadth and scope of the present disclosure.

Figure 9:
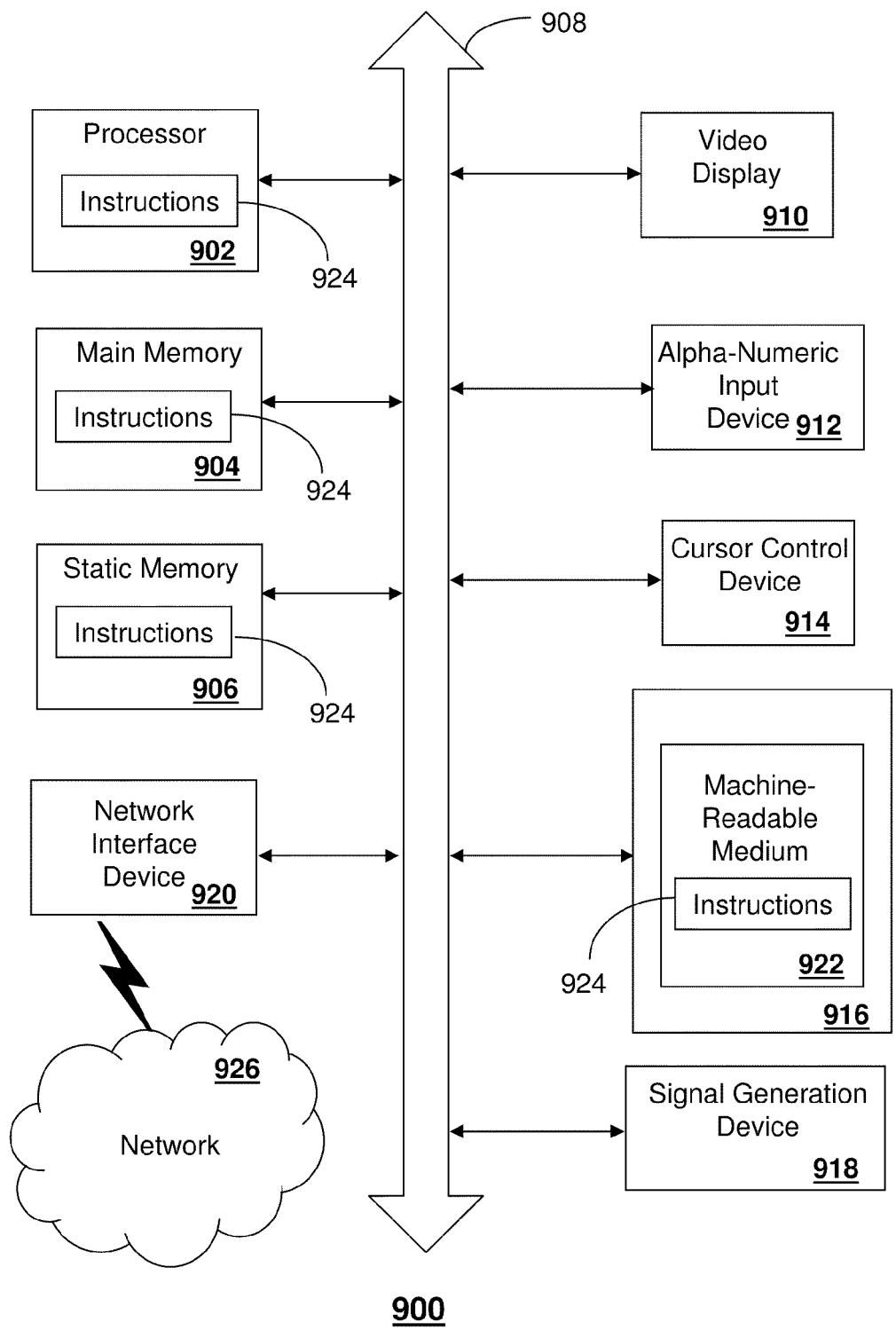
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
utilizing a processor for providing to a plurality of computing devices, an overlay combined with media content for presentation by each of the plurality of computing devices to illustrate one or more user-generated comments temporally associated with portions of the presented media content utilizing a time line and annotations along the time line that are representative of each of the one or more user-generated comments, wherein at least a portion of the one or more user-generated comments are shared among the plurality of computing devices;
collecting at the processor, the one or more user-generated comments from the plurality of computing devices;
utilizing the processor for detecting a correlation in the one or more user-generated comments collected from the plurality of computing devices;

utilizing the processor for facilitating establishment of a social network that includes at least a subset of the plurality of computing devices according to the detected correlation;

monitoring additional user-generated comments associated with the social network that are originated from the at least a subset of the plurality of computing devices;

determining a decorrelation in the additional user-generated comments; and removing at least one computing device of the at least a subset of the plurality of computing devices from the social network based on the determined decorrelation without terminating the social network.

2. The method of claim 1, wherein the correlation corresponds to detecting a behavioral pattern in the one or more user-generated comments collected from the plurality of computing devices, wherein the social network corresponds to a virtual network including the at least a subset of the plurality of computing devices, and wherein the computing devices comprise at least one of a computer, a portable communication device, or a gaming console.

3. The method of claim 1, comprising establishing the social network by way of an on-line social networking application.

4. The method of claim 1, wherein the method operates from an on-line social networking application.

5. The method of claim 1, comprising:
receiving from another computing device a request to identify at least one of the plurality of computing devices generating one or more user-generated comments that correlate to the one or more user generated comments generated by the other computing device;
identifying at least one of the plurality of computing devices generating one or more user-generated comments that correlate to the one or more user generated comments generated of another of the plurality of computing devices; and
transmitting to the other computing device at least one identification associated with the identified at least one computing device.

6. The method of claim 5, comprising receiving from the other computing device a request to establish the social network with the identified at least one computing device.

7. The method of claim 5, wherein the at least one identification corresponds to an identification of one of the identified at least one computing device and a user associated therewith.

8. The method of claim 1, comprising:
identifying the at least a subset of computing devices having the correlated user-generated comments
submitting a notice to the at least a subset of computing devices;
receiving a message from at least a portion of the at least a subset of computing devices indicating an interest or disinterest in joining the social network; and
facilitating establishing the social network according to the messages received from the computing devices.

9. A system, comprising:
a memory storing computer instructions; and
a controller coupled with the memory, wherein the controller when executing the computer instructions performs operations comprising:
collecting one or more remarks from each of a plurality of computing devices, wherein the one or more remarks are temporally associated with media content presented at the plurality of computing devices;
detecting a correlation in the one or more remarks collected from the plurality of computing devices;
facilitating establishment of a social network including at least a subset of the plurality of computing devices according to the detected correlation;
monitoring additional remarks associated with the social network;
determining a decorrelation in the additional remarks; and
removing a target computing device from the social network based on the determined decorrelation.

10. The system of claim 9, wherein the one or more remarks correspond to user-generated remarks, wherein an overlay is combined with the presentation of the media content, wherein the one or more user-generated remarks are temporally associated with the media content according to the overlay utilizing a time line and annotations along the time line that are representative of each of the user-generated remarks, and wherein at least a portion of the user-generated remarks are shared among the plurality of computing devices.

11. The system of claim 9, wherein the monitored additional remarks are originated from the at least a subset of the plurality of computing devices, wherein the correlation corresponds to detecting a behavioral pattern in the one or more remarks collected from the plurality of computing devices, and wherein the one or more remarks are temporally associated with a scene of the media content and are shared among one or more of the plurality of computing devices.

12. The system of claim 9, wherein the plurality of computing devices comprise a portable communication device, and wherein the controller generates one of the one or more remarks from a voice recording received from and captured by the portable communication device.

13. The system of claim 9, wherein the controller when executing the computer instructions performs operations comprising:
terminating the social network according to the determined decorrelation.

14. The system of claim 9, wherein the computer instructions comprise an online social networking application.

15. A non-transitory computer-readable storage medium in a computing device, comprising computer instructions which when executed by a processor cause the processor to perform operations comprising:
collecting one or more comments temporally associated with a presentation of media content; and
transmitting to a system the one or more comments, wherein the system is operable at least to:
collect the one or more comments from the computing device along with other comments from other computing devices;
detect a correlation in the one or more comments collected from the plurality of computing devices;
establish a social network between at least a subset of the plurality of computing devices according to the detected correlation;
collect additional comments associated with the social network that are originated from the computing device and the other computing devices that form a group of computing devices;
determine a decorrelation in the additional comments; and
remove at least one computing device of the group of computing devices from the social network based on the determined decorrelation.

16. The non-transitory computer-readable storage medium of claim 15, wherein the correlation corresponds to detecting a behavioral pattern in the one or more comments collected from the plurality of computing devices, and wherein the one or more comments are temporally associated with a scene of the media content and are shared among at least a portion of the groups of computing devices.

17. The non-transitory computer-readable storage medium of claim 15, wherein the system is operable at least to:
  terminate the social network according to the determined decorrelation.

18. The non-transitory computer-readable storage medium of claim 15, comprising computer instructions which when executing the computer instructions performs operations comprising:
  transmitting to the system a request to identify at least one of the plurality of computing devices generating one or more comments that correlate to the one or more comments generated by the computing device,
  wherein the system is operable at least to:
    identify at least one of the plurality of computing devices generating one or more comments that correlate to the one or more comments generated by the computing device; and
    transmit to the computing device an identification associated with the identified at least one computing device.

* * * * *